US011312038B2

(12) United States Patent
Thompson et al.

(10) Patent No.: US 11,312,038 B2
(45) Date of Patent: Apr. 26, 2022

(54) WOOD PRESERVATIVE COMPOSITION

(71) Applicant: ARCH WOOD PROTECTION, INC., Atlanta, GA (US)

(72) Inventors: Kimberlee Thompson, Decatur, GA (US); Susan Thomason, Oxford, GA (US); Alex Valcke, Dessel (BE); David Cantrell, York (GB)

(73) Assignee: ARCH WOOD PROTECTION, INC., Atlanta, GA (US)

( * ) Notice: Subject to any disclaimer, the term of this patent is extended or adjusted under 35 U.S.C. 154(b) by 297 days.

(21) Appl. No.: 14/701,243

(22) Filed: Apr. 30, 2015

(65) Prior Publication Data

US 2015/0314471 A1 Nov. 5, 2015

Related U.S. Application Data

(60) Provisional application No. 61/987,592, filed on May 2, 2014.

(51) Int. Cl.
| | |
|---|---|
| *B27K 3/22* | (2006.01) |
| *A01N 59/20* | (2006.01) |
| *A01N 43/653* | (2006.01) |
| *A01N 25/22* | (2006.01) |
| *B65D 85/00* | (2006.01) |
| *C08G 73/02* | (2006.01) |
| *B27K 3/15* | (2006.01) |

(52) U.S. Cl.
CPC .............. *B27K 3/22* (2013.01); *A01N 25/22* (2013.01); *A01N 43/653* (2013.01); *A01N 59/20* (2013.01); *B65D 85/70* (2013.01); *C08G 73/0226* (2013.01); *B27K 3/15* (2013.01)

(58) Field of Classification Search
CPC . B27K 3/22; B27K 3/15; B27K 3/343; A01N 25/22; A01N 43/653; A01N 59/20; A01N 3/00; B65D 85/70; C08G 73/0226; A61L 2/00; A61L 9/00; C08L 79/02
See application file for complete search history.

(56) References Cited

U.S. PATENT DOCUMENTS

| | | | |
|---|---|---|---|
| 4,778,833 A * | 10/1988 | Van der Drift | C08L 97/02 523/177 |
| 4,839,373 A | 6/1989 | Ito et al. | |
| 4,929,454 A | 5/1990 | Findlay et al. | |
| 4,950,685 A | 8/1990 | Ward | |
| 5,186,947 A | 2/1993 | Goettsche et al. | |
| 5,248,450 A | 9/1993 | Metzner et al. | |
| 5,385,926 A | 1/1995 | Fudwig et al. | |
| 5,407,920 A | 4/1995 | Dawson | |
| 5,714,507 A | 2/1998 | Valcke et al. | |
| 5,804,591 A | 9/1998 | Valcke et al. | |
| 5,874,025 A | 2/1999 | Heuer et al. | |
| 5,916,356 A | 6/1999 | Williams et al. | |
| 5,972,971 A | 10/1999 | Heuer et al. | |
| 5,977,168 A | 11/1999 | Konishi et al. | |
| 5,990,043 A | 11/1999 | Kugler et al. | |
| 6,211,218 B1 | 4/2001 | Goettsche et al. | |
| 6,242,440 B1 | 6/2001 | De Witte et al. | |
| 6,248,761 B1 | 6/2001 | Fujimoto | |
| 6,290,992 B1 * | 9/2001 | Magnuson-Hawkins | A01N 25/16 424/405 |
| 6,323,224 B1 | 11/2001 | Tsuboi et al. | |
| 6,521,288 B2 | 2/2003 | Laks et al. | |
| 6,558,685 B1 | 5/2003 | Kober et al. | |
| 6,936,624 B2 | 8/2005 | Tsuboi et al. | |
| 7,307,070 B2 | 12/2007 | Heuer et al. | |
| 7,323,187 B1 | 1/2008 | Schur | |
| 7,632,567 B1 | 12/2009 | Zhang et al. | |
| 7,674,481 B2 | 3/2010 | Leach et al. | |
| 9,603,358 B2 | 3/2017 | Hughes et al. | |
| 9,931,760 B2 | 4/2018 | Delis et al. | |
| 9,961,895 B2 * | 5/2018 | Hughes | A01N 59/20 |
| 2001/0000184 A1 | 4/2001 | Konishi et al. | |
| 2001/0051649 A1 | 12/2001 | Heuer et al. | |
| 2002/0083864 A1 | 7/2002 | Higaki | |
| 2003/0010956 A1 | 1/2003 | Las et al. | |
| 2004/0016909 A1 | 1/2004 | Zhang et al. | |
| 2004/0074441 A1 * | 4/2004 | Ray | B27K 3/08 118/400 |
| 2004/0211721 A1 | 10/2004 | Stamets | |

(Continued)

FOREIGN PATENT DOCUMENTS

| | | |
|---|---|---|
| AU | 2007203237 A1 | 2/2008 |
| CA | 2238033 A1 | 5/1997 |

(Continued)

OTHER PUBLICATIONS

Ahn et al., Environmentally friendly wood preservatives formulated with enzymatic-hydrolyzed okara, copper and/or boron salts, Journal of Hazardous Materials 178 (2010) 604-611.*
Hartner et al., Polymeric Betaine as a Wood Preservative, Wood Protecting Chemicals Section 3 (2008).*
Machine translation of JP 2003160402 A (published 2013) downloaded from the EPO Dec. 17, 2020 (Year: 2003).*
Nikiforova et al., "Copper Ion Sorption by Cellulose Sorbents Modified with Hydrophilic Nitrogen-Containing Polymers", Russian Journal of Applied Chemistry, 2010, vol. 83, No. 7, pp. 1170-1175.

(Continued)

*Primary Examiner* — Susan M Hanley
(74) *Attorney, Agent, or Firm* — Dority & Manning, P.A.

(57) ABSTRACT

The present invention provides wood preservative composition containing a dispersed and/or emulsified phase comprising a wood preservative component; and a stabilizer. The stabilizer is a cationic polymer, an enzyme, organic polymer, quaternary ammonium compound and/or a mixture thereof. Also provided is a method of preserving wood or other cellulosic material which comprises applying to the wood or other cellulosic material.

19 Claims, No Drawings

(56) References Cited

U.S. PATENT DOCUMENTS

| | | | |
|---|---|---|---|
| 2004/0258768 A1* | 12/2004 | Richardson | C09D 15/00 424/630 |
| 2004/0258838 A1 | 12/2004 | Richardson et al. | |
| 2005/0080089 A1 | 4/2005 | Tiedink et al. | |
| 2005/0227956 A1 | 10/2005 | Wang et al. | |
| 2005/0255251 A1* | 11/2005 | Hodge | A01N 25/04 427/397 |
| 2006/0075923 A1* | 4/2006 | Richardson | A01N 59/16 427/393 |
| 2006/0112850 A1 | 6/2006 | Zhang et al. | |
| 2006/0182706 A1 | 8/2006 | Mathauer et al. | |
| 2006/0251915 A1 | 11/2006 | Jin et al. | |
| 2006/0252847 A1 | 11/2006 | Hayward et al. | |
| 2006/0257578 A1 | 11/2006 | Zhang et al. | |
| 2006/0269583 A1 | 11/2006 | Garst et al. | |
| 2006/0276468 A1 | 12/2006 | Blow | |
| 2007/0021385 A1 | 1/2007 | Zhang et al. | |
| 2007/0082187 A1 | 4/2007 | Wang et al. | |
| 2007/0142410 A1 | 6/2007 | Garnier | |
| 2007/0151476 A1 | 7/2007 | Humar et al. | |
| 2007/0193473 A1* | 8/2007 | Zhang | A01N 43/653 106/15.05 |
| 2008/0046277 A1 | 2/2008 | Stamets | |
| 2008/0108680 A1 | 5/2008 | Bruns et al. | |
| 2008/0132569 A1 | 6/2008 | Chang et al. | |
| 2008/0138371 A1 | 6/2008 | Amrhein et al. | |
| 2008/0187669 A1 | 8/2008 | Kingma et al. | |
| 2008/0193640 A1 | 8/2008 | Zhang et al. | |
| 2009/0158961 A1* | 6/2009 | Zhang | A01N 59/20 106/18 |
| 2009/0203643 A1 | 8/2009 | Patel | |
| 2009/0280185 A1 | 11/2009 | Richardson et al. | |
| 2010/0068545 A1 | 3/2010 | Zhang et al. | |
| 2011/0030579 A1 | 2/2011 | Koop et al. | |
| 2014/0287250 A1 | 9/2014 | Schaller et al. | |

FOREIGN PATENT DOCUMENTS

| | | |
|---|---|---|
| CN | 1633853 A | 7/2005 |
| CN | 102239836 | 11/2011 |
| EP | 0554833 A1 | 8/1993 |
| EP | 2036435 A1 | 3/2009 |
| JP | 2003160402 A * | 6/2003 |
| JP | 2003252705 A | 9/2003 |
| WO | 9302557 A1 | 2/1993 |
| WO | 9718713 A1 | 5/1997 |
| WO | 0128331 A1 | 4/2001 |
| WO | 2004091875 A2 | 10/2004 |
| WO | 2006/118980 A2 | 11/2006 |
| WO | 2007053252 A1 | 5/2007 |
| WO | 2009014106 A1 | 1/2009 |
| WO | 2011038747 A1 | 4/2011 |
| WO | 2011161404 A1 | 12/2011 |
| WO | 2013/064798 A1 | 5/2013 |

OTHER PUBLICATIONS

Ursula Kues, "Wood Production, Wood Technology and Biotechnological Impacts", 2007, Universitatsverlag Gottingen, Available online at http://webdoc.sub.gwdg.de/univerlag/2007/wood_production.pdf.
International Search Report and Written Opinion for International Application No. PCT/US2015/028616 dated Aug. 3, 2015. (11 pages).
Australian Patent Examination Report No. 3 for Australian Patent Application No. 2011268757 dated Aug. 27, 2013. (3 pages).
Search Report under Section 17 for GB1110545.9 dated Oct. 21, 2011. (3 Pages).
International Search Report and Written Opinion for International Application No. PCT/GB2011/000930 dated Sep. 16, 2011. (10 Pages).
Ullmann's Encyclopedia of Industrial Chemistry, 6th edition, vol. 39, 2003, p. 489.
Freeman et al., "A comprehensive Review of Copper-Based Wood Preservatives with a focus on new micronized or dispersed copper-systems", Forest Products Journal, vol. 58, No. 11, pp. 6-27.
Schmidt, Wood and Tree Fungi, Biology, Damage, Protection, and Use, Springer, 2006, pp. 152.
Groot et al., "Using copper-tolerant fungi to biodegrade wood treated with copper based preservatives", International Biodeterioration & Biodegradable, 1999, vol. 44, pp. 6-27.
Schubert, et al.: "Protection of Wood from microorganisms by laccase-catalysed iodination", Applied and Environmental Microbiology, American Society for Microbiology, US, vol. 78, No. 20, Oct. 1, 2012 (Oct. 1, 2012), pp. 7267-7275.

* cited by examiner

WOOD PRESERVATIVE COMPOSITION

CROSS-REFERENCE TO RELATED APPLICATION

This application claims priority under 35 U.S.C. § 119(e) from Provisional Application No. 61/987,592, filed May 2, 2014, the disclosure of which is incorporated herein by reference.

FIELD OF THE INVENTION

The present invention relates to a wood preservative composition and a method of treating wood and other cellulosic material with the wood preservative composition.

BACKGROUND OF THE INVENTION

Many types of wood preservative treatments exist on the market today. These treatments can be surface applied by spray or dip, or impregnated into the wood by vacuum pressure immersion treatments. During industrial application of preservatives, the wood is typically impregnated with the treatment composition containing the wood preservative composition to achieve either shell or full cell type penetration into the wood substrate. Depending on the wood species being treated and the end use, the depth of penetration of the treatment composition into the wood can have a significant bearing on the useful service life of the treated wood.

A typical industrial treatment plant will consist of a storage tank to hold the treatment composition and an autoclave. Wood or other cellulosic material is charged into the autoclave and the autoclave is then flooded with treatment composition. Combinations of vacuum and pressure are applied to achieve the required penetration of treatment composition into the wood or other cellulosic material. During the treatment process, an amount of treatment composition is consumed by way of being absorbed into the wood or other cellulosic material. The amount of the treatment composition absorbed typically represents a relatively small amount of the total volume of treatment composition used to flood the autoclave. This generates a scenario whereby treatment composition is repeatedly exposed to wood or cellulosic material and becomes "aged" due to repeated use. The average age of a treatment composition increases as a function of solution refresh rates. This can extend from several days to many months. As a result, the treatment composition is repeatedly exposed to wood being treated increasing the average age of the composition.

It has been observed that the ability of the preservative to penetrate into the wood substrate or cellulosic substrate, as the treatment solution is repeatedly exposed to wood or cellulosic material, can deteriorate very significantly with each and every treatment. This can have significant consequences to the useful service life of the treated wood or cellulosic article. Although not wishing to be bound to theory, it is believed that disruptive substances from wood or cellulosic extractives increase in the preservative composition after each and every treatment. This reduces the ability of the preservative to penetrate the wood or cellulosic substrate in subsequent treatments and over time as the composition is repeatedly used. One remedy to this problem is taught in WO 2013/064798, assigned to Arch Timber Protection. However, the method described in WO 2013/064798 does not address dispersed and/or emulsified phases, which typically contain anionic, nonionic or anionic/nonionic blends of dispersants and emulsifiers.

The stability of systems with dispersants and emulsifiers is a delicate balance of steric and electrostatic mechanisms. Any significant changes in pH and/or solution charge can irreversibly disrupt this stability. Addition of acidic compounds to anionic dispersions, for example, can destabilize the composition and cause agglomeration and settling of dispersed compounds or creaming of emulsified material. This is commonly observed in wood preservatives systems containing dispersed biocides, emulsified water repellents, dispersed pigments, etc. In the present invention, various stabilizing compounds are disclosed which protect dispersed and/or emulsified phases from the disruptive substances generated during the wood treatment. Unexpectedly, cationic polymers, enzymes, organic polymers and quaternary ammonium compounds have been found that are not only compatible with anionic dispersion and/or emulsion phases but are also very effective at stabilizing these phases against charge fluctuations during subsequent treatment cycles and improving penetration of the dispersed and/or emulsified phase.

Accordingly, there is a need in the art for improving both stability and penetration of dispersed and/or emulsified phases in biocidal formulations into wood. The present invention provides an answer to that need.

SUMMARY OF THE INVENTION

In one aspect, the present invention provides wood preservative compositions containing a dispersed and/or emulsified phase comprising a wood preservative component; and a stabilizer. The stabilizer is a cationic polymer, an enzyme, an organic polymer, a quaternary ammonium compound and/or a mixture thereof. The stabilizer is present in an amount effective to stabilize the dispersed and/or emulsified phase of the preservative composition which will allow the wood preservative component to effectively penetrate a wood substrate intended to be protected by the wood preservative composition.

In further aspect of the present invention, the dispersed and/or emulsified phase contains a biocidal agent, colorant, water repellent, fire retardant, binder, emulsifier, co-solvent, dispersant, UV inhibitor, antioxidant, or a combination thereof. The biocidal component contains a biocidal metal compounds; boron containing biocides, organic fungicides such as of amides; anilides; anilinopyrimidine; aromatic compounds; fungicidal heterocyclic compounds; strobilurins; azoles; isothiazolones; cyclohexylhydroxydiazene 1-oxide, potassium salt, pyrion compounds; quaternary ammonium compounds or mixtures thereof.

In a particular embodiment, the biocidal agent is dispersed zinc and/or dispersed copper. The dispersed zinc or copper may be micronized zinc or micronized copper dispersed in a solvent.

In another embodiment, the cationic polymer is chitosan, cationic derivative of natural polymers selected from guar gum, starch, cellulose or hydroxycellulose, a polymer or copolymer having one or more of the following repeating units of formula (I), (II) or (III) described below or mixtures of the cationic polymers. The cation copolymer may have a molecular weight between 1,000 and 100,000. The composition may contain between about 0.001 and 10% by weight of the cationic polymer, more specifically between 0.01% and 4% by weight of the cationic polymer.

In yet a further embodiment of the present invention, the wood preservative composition contains a quaternary ammonium compound wherein the quaternary ammonium compound is trimethyl alkyl quaternary ammonium compounds; dialkyldimethyl quaternary ammonium compounds; alkyl dimethyl or alkyl diethyl benzyl ammonium compounds; polyethoxylated quaternary ammonium; N-substituted pyridinium compounds, monoalkyl methyl bisalkoxylated quaternary ammonium compounds, dialkyl bisalkoxylated quaternary ammonium compounds, a protonated amine, a protonated dialkylamine or a protonated trialkylamine, protonated monoalkyl bisalkoxylated amine, a complex of one or more of the forgoing quaternary ammonium compounds with a complexing agent, or mixtures thereof.

In another embodiment of the present invention, the quaternary ammonium compound is dialkyldimethyl quaternary ammonium compound selected from the group consisting of didecyl dimethyl ammonium chloride, didecyl dimethyl ammonium carbonate, didecyl dimethyl ammonium bicarbonate, dioctyl dimethyl ammonium chloride and octyl decyl dimethyl ammonium chloride, or a mixtures thereof.

In a further embodiment, the stabilizer may be an enzyme, wherein the enzyme comprises a lipase, lipoxygenase, esterase, laccase, peroxidase, pectinase, protease, amylase, cellulase and/or xylanase.

In yet a further embodiment, the stabilizer may be an organic polymer, wherein the organic polymer is an acrylamide polymer or copolymer, a polyethylene oxide or copolymer, an alkyl polyglucoside, or a mixture thereof.

In another aspect of the present invention, provided is a method of preserving wood or other cellulosic material which contains applying to the wood or other cellulosic material a wood preservative composition of any of the previous embodiments of the present invention.

In a further aspect of the present invention provided is a wood treatment system containing a storage tank adapted to receive the wood to be treated and in said tank a volume of treatment solution comprising a wood preservative composition of any of the previous embodiments of the present invention.

These and other aspects will become apparent when reading the detailed description of the invention.

DETAILED DESCRIPTION OF THE PREFERRED EMBODIMENTS

It has now been surprisingly found that the wood preservative compositions described herein are effective in treating wood and other cellulosic substrates, even after multiple applications of the wood treatment composition on to different wood or cellulosic substrates. As used herein, the term "preservative" as used herein means a composition that renders the material to which it is applied more resistant to insect, fungal and microbial attack than the same material without having the composition applied.

The wood preservative contains a dispersed and/or emulsified phase and a stabilizer. The dispersed and/or emulsified phase is selected from the group consisting of biocidal agents, colorants, water repellents, fire retardants, binders, emulsifiers, co-solvents, dispersants, UV inhibitors, or mixtures or combinations thereof. The stabilizer is selected from the group consisting of cationic polymers, enzymes, organic polymers, quaternary ammonium compounds and mixtures thereof.

It has been discovered that such stabilizing agents allow the wood preservative composition containing dispersed and/or emulsified phases to be used to treat wood or cellulosic substrates, while maintaining the stability of the dispersed and/or emulsified phases. The biocidal agent is able to effectively penetrate the wood or cellulosic substrate even after the preservative composition is used to treat several batches of wood or cellulosic substrates. That is, the preservative composition of the present invention does not agglomerate, settle or separate over time and retains its ability to penetrate wood or cellulosic substrates even after the wood preservative has been used to treat multiple batches of wood or cellulosic substrates.

The wood preservative composition contains a biocidal agent and a stabilizer. The stabilizer allows the wood preservative composition to be used to treat multiple wood or cellulosic substrates, while allowing the biocidal agent to effectively penetrate the wood or cellulosic substrate even after the preservative composition is used to treat several wood or cellulosic substrates. That is, the preservative composition of the present invention does not appreciably lose its ability to penetrate wood or cellulosic substrates even after the wood preservative has been used to treat multiple batches of wood or cellulosic substrates.

The wood preservative composition may comprise as a biocidal agent, inter alia, one or more of the following active agents; biocidal metal compounds (in which the metal ion is the active biocidal agent); boron containing biocides such as boric acid, oxides and salts thereof and organic fungicides including fungicidal amides such as prochloraz, penthiopyrad, dichlofluanid and tolylfluanid; anilide fungicides such as sedaxane and penflufen; anilinopyrimidine fungicides such as pyrimethanil, cyprodinil or mepanipyrim; fungicidal aromatic compounds such as chlorthalonil, cresol, dicloran, pentachlorophenol, sodium pentachlorophenol, 2-(thiocyanatomethylthio)-1,3-benzothiazole (TCMBC), dichlorophen, fludioxonil and 8-hydroxyquinoline; fungicidal heterocyclic compounds such as dazomet, fenpropimorph, bethoxazin and dehydroacetic acid; strobilurins such as azoxystrobin; azoles; isothiazolones; Potassium HDO (cyclohexylhydroxydiazene 1-oxide, potassium salt), pyrion compounds such as sodium pyrithione, zinc pyrithione, copper pyrithione, 1-hydroxy-2-pyridinone and pyrion disulfide; quaternary ammonium compounds, and mixtures thereof.

The azole compound, i.e. a compound comprising an azole group, may be an imidazole or a 1,2,4-triazole and is preferably represented by the general formula (A)

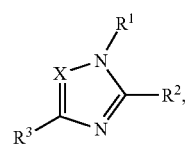

(A)

wherein

X denotes $CR^4$ or N;

$R^1$ denotes hydrogen or a linear, branched, cyclic, aromatic or any combination thereof, saturated or unsaturated, substituted or unsubstituted $C_1$ to $C_{40}$ group; wherein any of the carbon atoms other than those bound to the nitrogen atom shown in formula (A) may be replaced with an optionally substituted hetero atom;

$R^2$ denotes hydrogen, $C_1$-$C_8$ alkyl, $C_2$-$C_8$ alkenyl, $C_6$-$C_{10}$ aromatic, $C_5$-$C_{10}$ heteroaromatic or $C_1$-$C_4$ alkyl carbamate; and $R^3$ and $R^4$ denote hydrogen; or together $R^3$ and $R^4$ may provide a benzimidazole group (i.e. $R^3$ and $R^4$ may combine to form —$(CH)_4$— linkage).

The formulations of the invention may contain one or more azole compounds, such as mixtures of an imidazole and a 1,2,4-triazole, or mixtures of two or more 1,2,4-triazoles. However, the use 1,2,4-triazoles in the formulations of the invention is of particular interest.

An imidazole compound incorporates a five-membered di-unsaturated ring composed of three carbon atoms and two nitrogen atoms at non-adjacent positions. The imidazole compound may be a benzimidazole. Preferred compounds include thiabendazole, imazalil, carbendazim and prochloraz.

A 1,2,4-triazole compound incorporates a five-membered di-unsaturated ring composed of three nitrogen atoms and two carbon atoms at non-adjacent positions.

An exemplary triazole compounds include a triazole compound selected from compounds of formula (B):

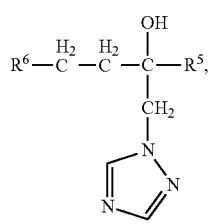

(B)

wherein
$R^5$ represents a branched or straight chain $C_{1-5}$ alkyl group (e.g. t-butyl), and
$R^6$ represents a phenyl group optionally substituted by one or more substituents selected from halogen (e.g. chlorine, fluorine or bromine) atoms or $C_{1-3}$ alkyl (e.g. methyl), $C_{1-3}$ alkoxy (e.g. methoxy), phenyl or nitro groups.

Alternatively, the triazole compound is advantageously selected from compounds of formula (C):

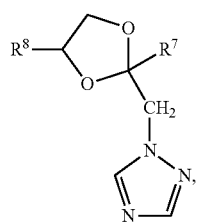

(C)

wherein
$R^7$ is as defined for $R^6$ above, and
$R^5$ represents a hydrogen atom or a branched or straight chain $C_{1-5}$ alkyl group (e.g. methyl, ethyl, propyl, etc).

Particular triazoles include, but are not limited to, triadimefon, triadimenol, triazbutil, propiconazole, cyproconazole, difenoconazole, fluquinconazole, tebuconazole, flusilazole, uniconazole, diniconazole, bitertanol, hexaconazole, azaconazole, flutriafol, epoxyconazoie, tetraconazole, penconazole, ipconazole, prothioconazole and mixtures thereof.

In one particular embodiment, the biocidal metal is a copper or a zinc metal. The biocidal metal may be a dispersed or an insoluble metal material. Examples of insoluble copper, such as in the form of submicron or micronized particles are Illustratively, U.S. Patent Application Nos. 2006/0062926 and 2005/0255251 and U.S. Pat. No. 8,409,627, the disclosures of which are incorporated herein by reference in their entireties. These applications describe methodologies for making submicron-sized biocidal particulate slurries, such as particulate copper slurries, and their use as wood preservatives. The micronized copper based composition is suitably prepared by using conventional grinding methodology, or other means known in the small particle production industry. The composition comprises one or more of micronized elemental copper or copper-containing compounds and a liquid carrier medium, such as water or an organic solvent in which the micronized copper is insoluble. The exemplary copper containing compounds include copper carbonates, copper oxides, copper hydroxides, copper chlorides, copper aromatic or aliphatic carboxylates, copper aminocarboxylates, and combinations thereof. The copper containing compound can also be any other suitable copper compounds known to those skilled in the art.

The term "micronized" as used herein means a particle size in the range of 0.001 to 25 microns. The term "particle size" refers to the largest axis of the particle, and in the case of a generally spherical particle, the largest axis is the diameter. Typically the insoluble micronized copper particles in the copper-based composition typically have a size such that wherein at least 95% of the particles have a particle diameter of from about 0.05 to about 1.5 microns, preferably from about 0.05 to about 1 micron, and most preferably from about 0.05 to about 0.7 microns. This type of insoluble metal material is referred to herein as dispersed metal.

The biocidal metal ion may be a biocidal zinc ion. The biocidal zinc may advantageously be incorporated into the formulation in the form of inorganic zinc salts, such as carbonate, bicarbonate, chloride, hydroxide, borate, oxide or phosphate. Alternatively, the zinc may be in the form of an organozinc compound such as a simple organic salt, such as formate or acetate, or as a complex such as N-nitroso-N-cyclohexyl-hydroxylamine-zinc (zinc-HDO), zinc naphthenate or zinc pyrithione (bis(2-pyridylthio)zinc 1,1'-dioxide—CAS number 13463-41-7). Other exemplary zinc compounds include zinc oxide, zinc carbonate, zinc chloride, zinc borate and zinc pyrithione.

In another embodiment, the metal may be included in the formulation of the invention as a solubilized metal ion, in addition to the dispersed or emulsified metal ions. Suitable methods for solubilizing metal ions such as copper and zinc are known in the art, for example from WO93/02557. Suitable complexing agents for the copper or zinc ion include, for example, polyphosphoric acids such as tripolyphosphoric acid; ammonia; water soluble amines and alkanolamines capable of complexing with copper or zinc cations; aminocarboxylic acids such as glycine, glutamic acid, ethylenediaminetetraacetic acid (EDTA), hydroxyethyldiamine triacetic acid, nitrilotriacetic acid and N-dihydroxy ethylglycine. Where the complexing agents are acidic in nature they may be employed either as free acids or as their alkali metal or ammonium salts. These complexing agents may be used either alone or in combination with each other. Exemplary complexing agents are selected from alkanolamines, such as monoethanolamine, diethanolamine, triethanolamine, monopropanolamine, dipropanolamine, and tripropanolamine. Ethanolamines are generally used, with monoethanolamine being of particular interest.

The cationic polymer used in the preservative composition includes chitosan; cationic derivative of natural polymers such as guar gum, starch, cellulose and hydroxycellulose; a polymer or copolymer having one or more of the following repeating units of formula (I), (II), (III) or (IV):

a. repeating units of formula (I)

I.
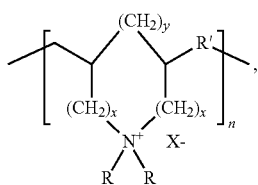

b. repeating units of formula (II)

II.
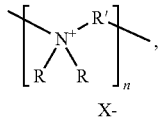

c. repeating units of formula (III)

III.
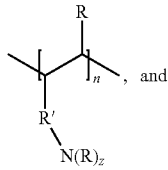

d. repeating units of formula (IV)

IV.
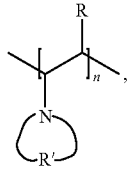

wherein n is between 1 to 5000;

x is an integer equal to 0, 1 or 2;

y is an integer equal to 0 or 1;

z is an integer equal to 2 or 3 and when z is 3, the nitrogen atom of formula III carries a positive charge and a counter ion X⁻ is present;

R groups, which can be identical or different, are each independently hydrogen or a straight chain, branched or cyclic alkyl, alkenyl, alkynyl, alkanoxyl, aryl, —(C=O)H, —(C=O)R", —CO₂H, —CO₂R", —CH₂CO₂H, —CH₂CO₂R", CH₂NR"R", —CH₂CH(OH)CH₂Cl, —(C=O)NR"R", —CN, —(CH₂)$_w$—O—R", in which;

R" groups, which can be identical or different, are hydrogen or a straight chain, branched or cyclic alkyl, alkenyl, alkynyl, alkanoxyl or aryl;

w is 2 or 3;

R' is a divalent group having one or more of the following groups V₁-V₈:

(V₁)
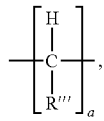

(V₂)
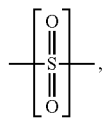

(V₃)
—NH—, (V₄)
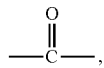

(V₅)
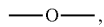
—O—, (V₆)
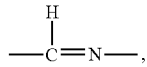

(V₇)
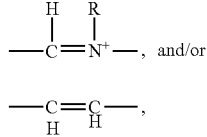
and/or (V₈)

in which;

R'" is H, OH, or N(R)$_x$;

a is 0 to 20; and

X⁻ is any anion selected from chloride, bromide, iodide, fluoride, sulphate, phosphate, carboxylate especially propionate and lactate, carbonate, bicarbonate, nitrate, nitrite, hydroxide, cyanide;

or mixtures of the cationic polymers.

Exemplary cationic polymers for use in the formulations of the invention include: chitosan, cationic derivatives of natural polymers including guar gum, starch, cellulose and hydroxyl cellulose; Polydiallyldimethylammonium chlorides (polyDADMAC), including polyDADMAC-co-sulphones (DADMAC-co-S₂), polyDADMAC-co-hydroxyethylcellulose (DADMAC-co-HEC), polyDADMAC-co-acrylamide (DADMAC-co-AM), polyDADMAC-co-acrylic acid (DADMAC-co-AA), and acrylic acid-DADMAC-acrylamide terpolymers (AA-co-DADMAC-AM); Polydiallylmethylamine chlorides (polyDAMAmC), including epichlorohydrin derivatives; Polydiallyamine chlorides (polyDAAmC), including polyDAAmC-co-sulphones (DAAmC-co-SO₂), polyDAAmC-co-maleic acid (DAAmC-co-MA); polyallylamines (polyAAm) including polyDAAmC-co-AAm; polyamines, including branched and linear epihalohydrin derivatives of polyamines or polyamidoamines, branched and linear polyethyleneimines (PEI), and polyionenes; polyvinyl amines (PVAm) including vinyl amine/vinyl formamide copolymers, polyvinyl imidazole, and quaternized polyvinyl imidazole; polyamides;

polyvinyl amides, including polyvinyl pyrrolidone and polyvinyl caprolactam; polyvinyl formamides; poly(acryloyloxy trimethyl ammonium (polyAcETA) or poly(methacryloyloxyethyl trimethyl ammonium) (polyMacETA) salts including polyMacETA-co-acrylamide (MacETA-co-Am), and polyMacETA-co-vinyl pyrrolidone (MacETA-co-VP); poly(acrylamidopropyl trimethyl ammonium) (polyAmPTA) or poly(methacrylamidopropyl trimethyl ammonium) (polyMamPTA) salts, including polyMamPTA-co-vinyl pyrrolidone (MamPTA-co-VP) and poly(acrylic acid-co-MamPTA-co-methyl acrylate) (AA-co-MamPTA-co-Mac).

Of particular interest are polyvinylamines, polyDADMACs, polyamines (both high and low MW polyamines), and polyionenes.

Generally the cationic polymer will have a molecular weight of about 1,000 to about 10,000, and typically will be in the range of about 2,000 to about 5,000. The preservative composition will generally contain between about 0.001% to about 10% by weight of the cationic polymer; typically between about 0.01% to about 4.0% by weight. A particularly useful range of the cationic polymer is in the 0.01 and 1.0%.

Exemplary cationic natural polymers include, for example, Guar Hydroxypropyltrimonium Chloride (Guar gum 2-hydroxy-3-(trimethylammonio) propyl ether chloride CAS #65497-29-2); Hydroxypropyl Guar Hydroxypropyltrimonium Chloride (Guar gum, 2-hydroxypropyl 2-hydroxy-3-(trimethylammonio)propyl ether, chloride CAS #71329-50-5); Starch Hydroxypropyltrimonium chloride (Starch, 2-hydroxy-3-(trimethylammonio)propyl ether, chloride CAS #56780-58-6); Cellulose, omega-ether with alpha-2-hydroxy-3-(trimethylammonio) propyl-omega-hydroxypoly(oxy-1,2-ethanediyl) chloride (Polyquaternium-10, CAS #68610-92-4); Hydroxyethyl cellulose dimethyl diallylammonium chloride copolymer (Polyquaternium-4 CAS #92183-41-0); and chitosan (CAS #9012-76-4).

Exemplary polyionenes include, for example, Poly[(dimethyliminio)-1,3-propanediyl(dimethyliminio)-1,6-hexanediylbromide (1:2)] (Hexadimethrine Bromide, Ionene-6,3 Bromide; CAS #28728-55-4), Poly[(dimethyliminio)-1,3-propanediyl(dimethyliminio)-1,6-hexanediylchloride (1:2)] (Hexadimethrine Chloride, Ionene-6,3 Chloride; CAS #68393-49-7), Poly[oxyethylene (dimethyliminio) ethylene (dimethylimino) ethylene dichloride] (Polixetonium chloride, Polyquaternium 42; CAS #31512-74-0), Poly[(dimethyliminio)-1,3-propanediyl bromide(1:1)] (Ionene-3,3; CAS #31622-87-4), Poly[(dimethyliminio)-1,6-hexanediylbromide (1:1)] (Ionene-6,6; CAS #31622-88-5), Poly[(dimethyliminio)-1,6-hexanediyl(dimethyliminio)-1,10-decanediyldibromide (1:2)] (Ionene-6,10; CAS #28728-57-6), Poly[(dimethyliminio)-1,2-ethanediyl (dimethyliminio)-1,5-pentanediylbromide(1:2)] (Ionene-2, 5; CAS #51325-19-0), [α-[4-[Tris(2-hydroxyethyl)ammonio]-2-buten-1-yl]-ω-[tris(2-hydroxyethyl)ammonio] poly[(dimethyliminio)-2-butene-1,4-diyl Chloride] Chloride; (Polidronium Chloride; Polyquaternium 1; CAS #75345-27-6), and Poly[bis(2-chloroethyl)ether 1,3-bis[3-(dimethylamino)propyl]urea] quaternized (Polyquaternium 2; CAS #68555-36-2).

Other stabilizers may be used either in place of or in combination with the cationic polymer and/or the quaternary ammonium compound. Such stabilizers include enzymes, organic polymers and mixtures thereof, wherein the stabilizer is present in an amount which will allow the preservative composition to effectively penetrate the wood being protected.

Particular enzymes include for example a lipase, lipoxygenase, esterase, laccase, peroxidase, pectinase, protease, amylase, cellulase, and/or xylanase.

Particular organic polymers include for example an acrylamide polymer or copolymers, and/or polyethylene oxide or copolymer. Further examples of organic polymers include alkyl polyglucosides, for example $C_6$-$C_{10}$ alkyl polyglucosides.

Particular quaternary ammonium compounds include trimethylalkyl quaternary ammonium compounds such as cocotrimethyl ammonium chloride; dialkyldimethyl quaternary ammonium compounds such as didecyl dimethyl ammonium chloride, didecyl dimethyl ammonium carbonate, didecyl dimethyl ammonium bicarbonate, dioctyl dimethyl ammonium chloride and octyl decyl dimethyl ammonium chloride, or mixtures thereof; alkyl dimethyl or diethyl benzyl ammonium salts such as benzalkonium chloride and benzalkonium hydroxide; polyethoxylated quaternary ammonium compounds such as N,N-didecyl-N-methyl-poly (oxyethyl) ammonium propionate (Bardap 26) or N,N-didecyl-N-methyl-poly(oxyethyl) ammonium lactate; and N-substituted pyridinium compounds such as cetyl pyridinium chloride. Further examples of quaternary ammonium compounds may include monoalkylmethyl bisalkoxylated quaternary ammonium salts such as cocoalkylmethyl bis (hydroxyethyl) ammonium chloride, ethoxylated; dialkyl bisalkoxylated quaternary ammonium salts such as didecyl bis(hydroxyethyl) ammonium hydroxide, ethoxylated. Other quaternary ammonium compounds may include quaternary ammonium compounds described herein which are complexed with an additional compound, such as a boron containing compound, for example, boric acid. An example of such a quaternary ammonium complex is didecyl bis (hydroxyethyl) ammonium borate, also referred to as a polymeric betaine, having the general formula D

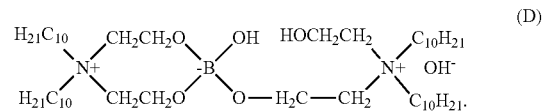

This particular compound has a CAS #21470-34-6. In this case, the complex is a complex of a dialkyl bisalkoxylated quaternary ammonium salts with boric acid. Other quaternary ammonium compound may also include quaternary amine salts formed by the protonation of monoalkylamines, dialkylamines, trialkylamines, and mono bisalkoxylated amines at pH values below their pKa.

Of these quaternary ammonium compounds of particular interest are benzalkonium chloride, didecyl dimethyl ammonium chloride and didecyl dimethyl ammonium carbonate. Of these quaternary ammonium compounds, didecyl dimethyl ammonium carbonate has been found to be particularly effective.

Types of wood which can benefit from treatment with the formulations of the invention include sawn timber, logs, glulam (glued laminated lumber), plywood, laminated veneer lumber (LVL), wood based composite products such as oriented strand board (OSB), medium density fiberboard (MDF), fiberboard, hardboard and particle board. It will be understood that "wood" in the context of this invention does not encompass living trees or other plants. Other cellulosic materials which can benefit from treatment with the formulations of the invention are lignocellulosic substrates, wood plastic composites, cardboard and cardboard faced building products such as plasterboard, and cellulosic material such as cotton. Also, leather, textile materials and even synthetic fibers, hessian, rope and cordage as well as composite wood materials. For convenience, the invention is described with reference to the treatment of wood but it will be appreciated that other cellulosic materials may be treated analogously. Generally, though not exclusively, the formulations are applied to sawn timber, logs or laminated veneer lumber, OSB or MDF.

For convenience, the preservative compositions of the present invention are applied as a liquid composition. They may also be applied as a solid implant or paste. The application of these formulations may be by one or more of dipping, deluging, spraying, brushing or other surface coating means or by impregnation methods, e.g. high pressure or double vacuum impregnation into the body of the wood or other material, all being techniques well known to the man skilled in the art. Impregnation under pressure is particularly advantageous when the substrate is wood or a wood composite material which is made to become wet during its life, for example, wood for window frames, timber used above ground in exposed environments such as decking and timber used in ground contact or fresh water or salt water environments.

The preservative compositions of the invention are preferably used in immersion treatments of wood, in particular immersion treatments which utilize a vacuum and/or pressure. Thus, in a further aspect, the present invention provides a wood treatment system comprising a storage tank adapted to receive the wood to be treated and in said tank a volume of treatment solution comprising a dispersed and/or emulsified phase and a stabilizer as defined herein. Optionally the system further comprises an autoclave. Optionally the system comprises means to apply a vacuum or pressure, e.g. 25-95% of a full vacuum and 8-12 bar pressure.

Substrates made of wood or cellulosic material which have been treated with a formulation or product or by a method according to the invention as described herein, comprise further aspects of the present invention. Additionally, substrates made of wood or other cellulosic material containing a dispersed and/or emulsified phase and a stabilizer (e.g. a formulation) according to the invention comprise a further aspect of the present invention.

The present invention is further described in detail by means of the following Examples. All parts and percentages are by weight and all temperatures are degrees Celsius unless explicitly stated otherwise.

EXAMPLES

The micronized copper-based dispersion was prepared by micronizing basic copper carbonate (BCC) from a single source using a commercial grinding apparatus, and adding dispersing agents to prevent agglomeration of the micronized particles.

A micronized copper concentrate containing about 60% solids was prepared by mixing basic copper carbonate with water, a polycarboxylate dispersant, and a lignosulfonate dispersant wherein the dispersants were used in a 10:1 mixture, respectively. The mixture was mechanically stirred using a high speed mixer for 30 minutes. The mixture was then transferred into a LabStar bead mill, supplied by Netzsch Laboratories, and milled for 90 minutes at 1200 rpm.

An emulsifiable azole concentrate was prepared at 10 weight percent azoles and 1:1 wt. ratio of Tebuconazole and Propiconazole in a surfactant and/or solvent. Emulsifiable azole/imidacloprid concentrates were prepared at 10.5 wt. percent actives with a 1:1:0.1 wt. ratio of Tebuconazole, Propiconazole and Imidacloprid in a surfactant and/or solvent.

The copper/azole composition was prepared by adding 272.7 grams of the micronized copper concentrate and 36.6 gram of the azole concentrate to water. The final weight of the wood treating solution was brought up to 100 pounds. The composition was calculated to be 0.2 weight percent copper and 0.008 weight percent azoles.

The azole/imidacloprid emulsion control was prepared by adding 217.7 grams of the azole/imidacloprid concentrate to water. The final weight of the wood treating solution was brought up to 100 pounds. The emulsion was calculated to be 0.005 weight percent azoles and 0.0025 weight percent imidacloprid. The emulsion was made 4 times and mixed together and then separated into 4 equal samples.

Where indicated in the following examples, preservative treatment solutions were aged to replicate commercial treatment plant solutions by the addition of Southern pine sawdust at 3.5% w/w and stirring for 1 hour. Solutions were then filtered to remove sawdust prior to wood treatment.

The following treatment solutions were made for Example 1.

Example 1

Control (fresh)—Copper/azole composition without additives.

Control (aged)—Copper/azole composition without additives.

Sample 1 (aged)—Copper/azole composition with 500 ppm didecyl dimethyl ammonium carbonate.

Sample 2 (aged)—Copper/azole composition with 500 ppm didecyl dimethyl ammonium carbonate and 250 ppm of the cationic polymer, polydimethylamine-co-epichlorohydrin.

Each of the treatment solutions were used to treat six southern yellow pine boards (2 inch×6 inch×24 inches). The boards were placed in an autoclave and were subjected to a vacuum of 24 inches of Hg for 5 minutes. Then the treatment solution was added to the autoclave and subjected to a pressure of 150 psi for a period of 20 minutes. The treatment solution was removed from the autoclave and then the boards were subject to 24 inches of Hg vacuum for 30 minutes. The boards were removed from the autoclave. The solution uptake for each of the solutions was determined and is reported in Table 1. As can be seen, gains in preservative solution uptake of 1.8 to 8.3% were seen with the presence of stabilizing additives.

TABLE 1

| Sample | Uptake (lbs/cu ft.) | % Increase vs. Control (aged) |
|---|---|---|
| Control (fresh) | 30.5 | — |
| Control (aged) | 27.6 | — |
| Sample 1 (aged) | 28.1 | 1.8 |
| Sample 2 (aged) | 29.9 | 8.3 |

Example 2

Control (fresh)—Copper/azole composition without additives.

Control (aged)—Aged copper composition without additives.

Sample 1 (aged)—Copper/azole composition with 500 ppm didecyl dimethyl ammonium carbonate.

Sample 2 (aged)—Copper/azole composition with 250 ppm of the cationic polymer, polydimethylamine-co-epichlorohydrin.

Sample 3 (aged)—Copper/azole composition with 500 ppm didecyl dimethyl ammonium carbonate and 250 ppm of the cationic polymer, polydimethylamine-co-epichlorohydrin.

Each of the treatment solutions were used to treat six southern yellow pine boards (2 inch×6 inch×24 inches). The boards were placed in an autoclave and were subjected to a vacuum of 24 inches of Hg for 5 minutes. Then the treatment solution was added to the autoclave and subjected to a pressure of 150 psi for a period of 10 minutes. The treatment solution was removed from the autoclave and then the boards were subject to 24 inches of Hg vacuum for 30 minutes. The boards were removed from the autoclave. The solution uptake for each of the solutions was determined and is reported in Table 2. Stabilizing additives resulted in a 23-36% increase in solution uptakes.

TABLE 2

| Sample | Uptake (lbs/cu ft.) | % Increase vs. Control (aged) |
| --- | --- | --- |
| Control (fresh) | 27.7 | — |
| Control (aged) | 17.5 | — |
| Sample 1 (aged) | 21.6 | 23.4 |
| Sample 2 (aged) | 23.8 | 36.0 |
| Sample 3 (aged) | 23.9 | 36.6 |

Example 3

Control (aged)—Copper/azole composition without additives.

Sample 1 (aged)—Copper/azole composition with 200 ppm polyvinylamine.

Sample 2 (aged)—Copper/azole composition with 200 ppm polyamine low MW.

Sample 3 (aged)—Copper/azole composition with 200 ppm polyamine high MW.

Sample 4 (aged)—Copper/azole composition with 200 ppm poly(diallyldimethyl ammonium chloride).

Sample 5 (aged)—Copper/azole composition with 200 ppm of polyionene.

Each of the treatment solutions were used to treat a southern yellow pine board (2 inch×6 inch×24 inches). The boards were placed in an autoclave and were subjected to a vacuum of 24 inches of Hg for 5 minutes. Then the treatment solution was added to the autoclave and subjected to a pressure of 150 psi for a period of 25 minutes. The treatment solution was removed from the autoclave and then the boards were subject to 24 inches of Hg vacuum for 30 minutes. The boards were removed from the autoclave. The solution uptake for each of the solutions was determined and is reported in Table 3. Gains of up to 50% in solution uptake were seen when stabilizing additives when included in the treatments.

TABLE 3

| Sample | Uptake (lbs/cu ft.) | % Increase vs. Control (aged) |
| --- | --- | --- |
| Control (aged) | 22 | — |
| Sample 1 | 26 | 18 |
| Sample 2 | 30 | 39 |
| Sample 3 | 31 | 43 |
| Sample 4 | 31 | 44 |
| Sample 5 | 33 | 52 |

Example 4

Control—copper/azole (25/1 w/w) composition without additives.

Sample 1—copper/azole/$C_8$ alkyl glucoside (44 ppm) composition.

Sample 2—copper/azole/$C_8$ alkyl glucoside (88 ppm) composition.

Sample 3—copper/azole/$C_8$ alkyl glucoside (176 ppm) composition.

Sample 4—copper/azole/$C_6$ alkyl glucoside (44 ppm) composition.

Sample 5—copper/azole/$C_6$ alkyl glucoside (88 ppm) composition.

Sample 6—copper/azole/$C_6$ alkyl glucoside (176 ppm) composition.

Each of the treatment solutions were used to treat six end-sealed southern yellow pine boards (2 inch×6 inch×8 inches). The boards were placed in an autoclave and were subjected to a vacuum of 24 inches of Hg for 5 minutes. Then the treatment solution was added to the autoclave and subjected to a pressure of 150 psi for a period of 10 minutes. The treatment solution was removed from the autoclave and then the boards were subject to 24 inches of Hg vacuum for 30 minutes. The boards were removed from the autoclave. The solution uptake for each of the solutions was determined and is reported in Table 4. All samples had increased solution uptakes vs. the control.

TABLE 4

| Sample | Uptake (lbs/cu ft.) | % Increase vs. Control |
| --- | --- | --- |
| Control | 28.2 | — |
| Sample 1 | 28.8 | 2.3 |
| Sample 2 | 28.8 | 2.0 |
| Sample 3 | 29.7 | 5.3 |
| Sample 4 | 29.1 | 3.0 |
| Sample 5 | 30.0 | 6.2 |
| Sample 6 | 31.2 | 10.5 |

Wafers (2 inch×6 inch×0.5 inches) were taken from each board and cut into 3 zones: Zone 1 (exterior ¼"), Zone 2 (second ¼"), and Zone 3 (core). Each zone was ground into sawdust and analyzed for copper and azoles. The relative wt. % copper and azoles in each zone are shown in Tables 5 and 6. Improved penetration gradients for copper and azole preservatives were observed for all samples in Zone 2 and/or Zone 3.

TABLE 5

| Sample | Cu, as % of Zone 1 | | | Zone 2 % Change vs. Control | Zone 3 % Change vs. Control |
| --- | --- | --- | --- | --- | --- |
| | Zone 1 | Zone 2 | Zone 3 | | |
| Control | 100 | 76.7 | 69.9 | — | — |
| Sample 1 | 100 | 82.1 | 81.1 | 7.1 | 16.0 |
| Sample 2 | 100 | 74.0 | 71.0 | −3.5 | 1.6 |
| Sample 3 | 100 | 84.2 | 88.4 | 9.8 | 26.5 |
| Sample 4 | 100 | 85.2 | 89.1 | 11.0 | 27.5 |
| Sample 5 | 100 | 76.8 | 77.8 | 0.2 | 11.3 |
| Sample 6 | 100 | 73.9 | 76.6 | −3.7 | 9.6 |

TABLE 6

| Sample | Azole, as % of Zone 1 | | | Zone 2 % Change vs. Control | Zone 3 % Change vs. Control |
| --- | --- | --- | --- | --- | --- |
| | Zone 1 | Zone 2 | Zone 3 | | |
| Control | 100 | 43.6 | 29.0 | — | — |
| Sample 1 | 100 | 45.6 | 33.3 | 4.7 | 14.8 |
| Sample 2 | 100 | 43.9 | 31.6 | 0.7 | 8.8 |
| Sample 3 | 100 | 45.8 | 37.3 | 5.1 | 28.4 |
| Sample 4 | 100 | 50.8 | 41.0 | 16.7 | 41.2 |
| Sample 5 | 100 | 46.2 | 33.8 | 6.0 | 16.6 |
| Sample 6 | 100 | 45.4 | 31.8 | 4.4 | 9.6 |

Example 5

Control—Azole/Imidacloprid emulsion without additives.
Sample 1—Azole/Imidacloprid/polyamine low MW (50 ppm) emulsion.
Sample 2—Azole/Imidacloprid/polyamine low MW (100 ppm) emulsion.
Sample 3—Azole/Imidacloprid/polyamine low MW (150 ppm) emulsion.
Sample 4—Azole/Imidacloprid/polyamine low MW (200 ppm) emulsion.

Each of the treatment solutions were used to treat six southern yellow pine boards (2 inch×6 inch×24 inches). The boards were placed in an autoclave and were subjected to a vacuum of 24 inches of Hg for 5 minutes. Then the treatment solution was added to the autoclave and subjected to a pressure of 150 psi for a period of 10 minutes. The treatment solution was removed from the autoclave and then the boards were subject to 24 inches of Hg vacuum for 30 minutes. The boards were removed from the autoclave. The solution uptake for each of the solutions was determined and is reported in Table 7.

TABLE 7

| Sample | Uptake (lbs/cu ft.) | % Increase vs. Control |
| --- | --- | --- |
| Control | 26.0 | — |
| Sample 1 | 35.5 | 36.7 |
| Sample 2 | 36.4 | 40.0 |
| Sample 3 | 34.4 | 32.2 |
| Sample 4 | 35.5 | 36.7 |

Wafers (2 inch×6 inch×0.5 inches) were taken from each board and cut into 3 zones: Zone 1 (exterior ¼"), Zone 2 (second ¼"), and Zone 3 (core). Each zone was ground into sawdust and analyzed for azole and imidacloprid concentration. The relative azole and imidacloprid concentrations in each zone are shown in Tables 8 and 9. Improved penetration gradients for azole and imidacloprid preservatives were observed for all samples vs. control in Zone 2 and/or Zone 3.

TABLE 8

| Sample | Azoles, as % of Zone 1 | | | Zone 2 % Change vs. Control | Zone 3 % Change vs. Control |
| --- | --- | --- | --- | --- | --- |
| | Zone 1 | Zone 2 | Zone 3 | | |
| Control | 100 | 33.9 | 16.6 | — | — |
| Sample 1 | 100 | 48.4 | 29.5 | 0.0 | 0.0 |
| Sample 2 | 100 | 48.0 | 30.6 | −0.8 | 3.7 |
| Sample 3 | 100 | 55.0 | 35.1 | 13.6 | 18.8 |
| Sample 4 | 100 | 53.9 | 34.6 | 11.4 | 17.0 |

TABLE 9

| Sample | Imidacloprid, as % of Zone 1 | | | Zone 2 % Change vs. Control | Zone 3 % Change vs. Control |
| --- | --- | --- | --- | --- | --- |
| | Zone 1 | Zone 2 | Zone 3 | | |
| Control | 100 | 43.8 | 31.3 | — | — |
| Sample 1 | 100 | 61.1 | 50.0 | 39.7 | 60.0 |
| Sample 2 | 100 | 55.6 | 50.0 | 27.0 | 60.0 |
| Sample 3 | 100 | 61.1 | 55.6 | 39.7 | 77.8 |
| Sample 4 | 100 | 68.8 | 56.3 | 57.1 | 80.0 |

While the invention has been described above with references to specific embodiments thereof, it is apparent that many changes, modifications and variations can be made without departing from the invention concept disclosed herein. Accordingly, it is intended to embrace all such changes, modifications, and variations that fall within the spirit and broad scope of the appended claims.

What is claimed is:
1. A wood preservative composition comprising
a) a wood preservative component comprising an insoluble metal material in a liquid, the insoluble metal material comprising a biocidal metal being dispersed copper or dispersed zinc;
b) a stabilizer comprising a cationic polymer; and;
c) optionally a boron containing biocide;
wherein the stabilizer is present in an amount effective to stabilize the wood preservative component thereby facilitating the wood preservative component to penetrate a wood substrate intended to be protected by the wood preservative composition; and
wherein the cationic polymer comprises polymers or copolymers having one or more of the following repeating units of formula (1); (II), (III) or (IV):

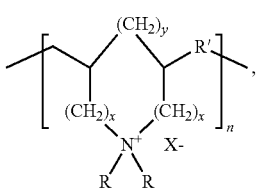

I.

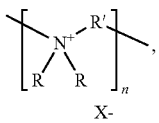

II.

-continued

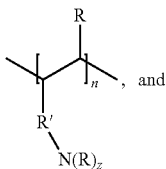
III.

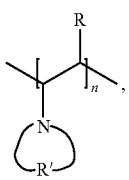
IV.

wherein
n is between 1 to 5000;
x is an integer equal to 0, 1, or 2;
y is an integer equal to 0 or 1;
z is an integer equal to 2 or 3 and when z is 3, the nitrogen atom of formula III carries a positive charge and a counter ion X— is present;
R groups, which can be identical or different, are each independently hydrogen or a straight chain, branched or cyclic alkyl, alkenyl, alkynyl, alkanoxyl, aryl, —(C═O)H, —(C═O)R″, —CO2H, —CO2R″, —CH2CO2H, —CH2CO2R″, CH2NR″R″, —CH2CH(OH)CH2Cl, —(C═O)NR″R″, —CN, —(CH2)w-O—R″, in which: R″ groups, which can be identical or different, are hydrogen or a straight chain, branched or cyclic alkyl, alkenyl, alkynyl, alkanoxyl or aryl;
w is 2 or 3;
R' is a divalent group having one or more of the following groups V1-V8:

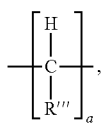 (V₁)

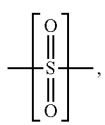 (V₂)

—NH— , (V₃)

 (V₄)

—O— , (V₅)

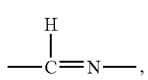 (V₆)

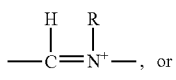 (V₇)

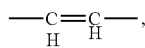 (V₈)

in which:
R‴ is H, OH, or N(R)x;
a is 1 to 20; and
X— is any anion selected from chloride, bromide, iodide, fluoride, sulphate, phosphate, carboxylate, carbonate, bicarbonate, nitrate, nitrite, hydroxide, and cyanide;
or mixtures of the cationic polymers;
wherein the amount of the cationic polymer or copolymer is less than the biocidal metal on a weight to weight basis.

2. The wood preservative composition according to claim 1, further comprising at least one azole, wherein the at least one azole comprises an imidazole, a 1,2,4-triazole, or mixtures thereof.

3. The wood preservative composition according to claim 1, further comprising at least one azole, wherein the at least one azole comprises thiabendazole, imazalil, carbendazim, prochloraz, triadimefon, triadimenol, triazbutil, propiconazole, cyproconazole, difenoconazole, fluquinconazole, tebuconazole, flusilazole, uniconazole, diniconazole, bitertanol, hexaconazole, azaconazole, flutriafol, epoxyconazoie, tetraconazole, penconazole, ipconazole, prothioconazole or mixtures thereof.

4. The wood preservative composition according to claim 2, further comprising a second azole.

5. The wood preservative composition according to claim 4, wherein the at least one azole and the second azole, comprise tebuconazole and propiconazole.

6. The wood preservative composition according to claim 1, wherein the wood preservative component further includes imidacloprid.

7. The wood preservative composition according to claim 1, wherein the wood preservative composition includes a quaternary ammonium compound.

8. The wood preservative composition according to claim 7, wherein the quaternary ammonium compound is selected from the group consisting of trimethyl alkyl quaternary ammonium compounds; dialkyldimethyl quaternary ammonium compounds; alkyl dimethyl or alkyl diethyl benzyl ammonium compounds; polyethoxylated quaternary ammonium; N-substituted pyridinium compounds, monoalkyl methyl bisalkoxylated quaternary ammonium compounds, dialkyl bisalkoxylated quaternary ammonium compounds, a protonated amine, a protonated dialkylamine or a protonated trialkylamine, protonated monoalkyl bisalkoxylated amine, a complex of one or more of the foregoing quaternary ammonium compounds with a complexing agent, or mixtures thereof.

9. The wood preservative composition according to claim 7, wherein the quaternary ammonium compound is dialkyldimethyl quaternary ammonium compound selected from the group consisting of didecyl dimethyl ammonium chloride, didecyl dimethyl ammonium carbonate, didecyl dimethyl ammonium bicarbonate, dioctyl dimethyl ammonium chloride and octyl decyl dimethyl ammonium chloride, or mixtures thereof.

10. The wood preservative composition according to claim 1, wherein the wood preservative component further comprises an organic fungicide selected from the group consisting of amides, anilides, anilinopyrimidine, aromatic compounds, fungicidal heterocyclic compounds, strobilurins, isothiazolones, cyclohexylhydroxydiazene 1-oxide, potassium salt, pyrion compounds, or mixtures thereof.

11. The wood preservative composition according to claim 1, wherein the wood preservative component further comprises a colorant, water repellent, fire retardant, binder, emulsifier, co-solvent, dispersant, UV inhibitor, antioxidant, or a combination thereof.

12. The wood preservative composition according to claim 1, wherein the biocidal metal comprises dispersed copper, wherein the dispersed copper comprises micronized copper dispersed in a solvent, or wherein the biocidal metal comprises dispersed zinc, wherein the dispersed zinc comprises micronized zinc dispersed in a solvent.

13. The wood preservative composition according to claim 1, wherein the cationic polymer has a molecular weight between 1,000 and 100,000.

14. The wood preservative composition according to claim 1, wherein the composition contains between about 0.01% and 4% by weight of the cationic polymer.

15. The wood preservative composition according to claim 1, further comprising an organic polymer comprises an acrylamide polymer or copolymer, a polyethylene oxide or copolymer, an alkyl polyglucoside, or a mixture thereof.

16. A method of preserving wood or other cellulosic material which comprises applying to the wood or other cellulosic material a wood preservative composition of claim 1.

17. A wood treatment system comprising a storage tank adapted to receive the wood to be treated and in said tank a volume of treatment solution comprising a wood preservative composition as defined in claim 1.

18. A wood preservative composition comprising
a) a wood preservative component comprising an insoluble metal material in a liquid, the insoluble metal material comprising a biocidal metal being dispersed copper or dispersed zinc;
b) a stabilizer, wherein the stabilizer selected from the group consisting of cationic polymers, organic polymers, quaternary ammonium compounds and mixtures thereof, wherein the quaternary ammonium compounds are selected from the group consisting of methyl alkyl quaternary ammonium compounds, dialkyldimethyl quaternary ammonium compounds and polyethoxylated quaternary ammonium compounds; and
c) optionally a boron containing biocide;
wherein the wood preservative composition further comprises an organic fungicide selected from the group consisting of amides, anilides, anilinopyrimidine, aromatic compounds, fungicidal heterocyclic compounds, strobilurins, azoles, isothiazolones, cyclohexylhydroxydiazene 1-oxide, potassium salt, pyrion compounds, quaternary ammonium compounds and mixtures thereof;
wherein the stabilizer is present in an amount effective to stabilize the wood preservative component thereby facilitating the wood preservative component to penetrate a wood substrate intended to be protected by the wood preservative formulation, and
wherein the amount of the biocidal metal is greater than the amount of the stabilizer on a weight by weight basis.

19. The wood preservative composition according to claim 18, wherein the biocidal metal comprises a biocidal copper compound, and further comprises an azole.

* * * * *